(12) United States Patent
Jiang et al.

(10) Patent No.: US 11,639,049 B2
(45) Date of Patent: May 2, 2023

(54) FUNCTIONAL LAMINATE USING WATER-BASED ADHESIVE, METHOD FOR MAKING SUCH LAMINATE, AND LENS USING SUCH LAMINATE

(71) Applicant: Essilor International, Charenton-le-Pont (FR)

(72) Inventors: Peiqi Jiang, Dallas, TX (US); Marvin Pounders, Dallas, TX (US)

(73) Assignee: Essilor International, Charenton-le-Pont (FR)

( * ) Notice: Subject to any disclaimer, the term of this patent is extended or adjusted under 35 U.S.C. 154(b) by 46 days.

(21) Appl. No.: 17/059,381

(22) PCT Filed: May 27, 2019

(86) PCT No.: PCT/EP2019/063664
§ 371 (c)(1),
(2) Date: Nov. 27, 2020

(87) PCT Pub. No.: WO2019/228989
PCT Pub. Date: Dec. 5, 2019

(65) Prior Publication Data
US 2021/0213714 A1    Jul. 15, 2021

(30) Foreign Application Priority Data
May 29, 2018 (EP) ..................... 18305654

(51) Int. Cl.
*B32B 27/08* (2006.01)
*B32B 7/12* (2006.01)
(Continued)

(52) U.S. Cl.
CPC ................. *B32B 27/08* (2013.01); *B32B 7/12* (2013.01); *B32B 23/08* (2013.01); *B32B 23/20* (2013.01);
(Continued)

(58) Field of Classification Search
CPC .... B32B 2307/4026; B32B 2037/1276; B32B 38/0008; B32B 37/1284; B32B 27/40;
(Continued)

(56) References Cited

U.S. PATENT DOCUMENTS 8,746,879 B2    6/2014 Jiang et al.
9,315,693 B2    4/2016 Jiang et al.
(Continued)

FOREIGN PATENT DOCUMENTS

CN    101600776 A    12/2009
CN    105940327 A    9/2016
(Continued)

OTHER PUBLICATIONS

International Search Report for PCT/EP2019/063664 dated Jun. 19, 2019, 3 pages.
(Continued)

*Primary Examiner* — Vishal I Patel
(74) *Attorney, Agent, or Firm* — Nixon & Vanderhye

(57) ABSTRACT

Disclosed are methods for preparing a laminate incorporable to a surface of an optical lens. A front surface and/or back surface of a photochromic film or a functional film is pre-treated. A second thermoplastic film is then laminated on each pre-treated surface of the photochromic film or functional film using a water-based adhesive. The pre-treatment applied on the surface(s) of the photochromic film or functional film enables the formation of strong adhesion between the second thermoplastic film and the water-based adhesive.

13 Claims, 1 Drawing Sheet

(51) Int. Cl.
  *B32B 23/08* (2006.01)
  *B32B 23/20* (2006.01)
  *B32B 27/16* (2006.01)
  *B32B 27/28* (2006.01)
  *B32B 27/30* (2006.01)
  *B32B 27/36* (2006.01)
  *B32B 27/40* (2006.01)
  *B32B 37/12* (2006.01)
  *C09J 129/04* (2006.01)
  *C09J 175/06* (2006.01)
  *G02B 5/22* (2006.01)
  *G02B 5/23* (2006.01)
  *B32B 38/00* (2006.01)

(52) U.S. Cl.
  CPC ............ *B32B 27/16* (2013.01); *B32B 27/285* (2013.01); *B32B 27/306* (2013.01); *B32B 27/365* (2013.01); *B32B 27/40* (2013.01); *B32B 37/1284* (2013.01); *C09J 129/04* (2013.01); *C09J 175/06* (2013.01); *G02B 5/223* (2013.01); *G02B 5/23* (2013.01); *B32B 38/0008* (2013.01); *B32B 2037/1276* (2013.01); *B32B 2307/4026* (2013.01); *B32B 2307/42* (2013.01); *B32B 2310/14* (2013.01)

(58) Field of Classification Search
  CPC ......... B32B 27/285; B32B 27/16; B32B 7/12; B32B 27/08; C09J 175/06; C09J 129/04
  See application file for complete search history.

(56) References Cited

U.S. PATENT DOCUMENTS

| | | | |
|---|---|---|---|
| 10,364,378 | B2 | 7/2019 | Jiang et al. |
| 2004/0096666 | A1 | 5/2004 | Knox et al. |
| 2005/0009964 | A1 | 1/2005 | Sugimura et al. |
| 2013/0299070 | A1 | 11/2013 | Kawamura |
| 2016/0243774 | A1* | 8/2016 | Nam ................. B32B 27/40 |
| 2016/0299261 | A1* | 10/2016 | Harris ............... B32B 27/365 |

FOREIGN PATENT DOCUMENTS

| | | | |
|---|---|---|---|
| EP | 2 902 822 | 8/2015 | |
| EP | 2902822 A1 * | 8/2015 | ............ B32B 27/06 |
| WO | 2008/088633 A1 | 7/2008 | |
| WO | 2014/030814 A1 | 2/2014 | |
| WO | 2017/009680 | 1/2017 | |

OTHER PUBLICATIONS

Written Opinion of the ISA for PCT/EP2019/063664 dated Jun. 19, 2019, 5 pages.

Office Action issued in Chinese Patent Application No. 201980034185.9, dated Sep. 8, 2022.

* cited by examiner

FUNCTIONAL LAMINATE USING WATER-BASED ADHESIVE, METHOD FOR MAKING SUCH LAMINATE, AND LENS USING SUCH LAMINATE

CROSS-REFERENCE TO RELATED APPLICATIONS

This application is the U.S. national phase of International Application No. PCT/EP2019/063664 filed May 27, 2019 which designated the U.S. and claims priority to EP 18305654.8 filed May 29, 2018, the entire contents of each of which are hereby incorporated by reference.

FIELD OF INVENTION

The present invention concerns a method of making a polymeric laminate that can be incorporated on an optical lens. More specifically, the present invention concerns a method of making a polymeric laminate that contains a thermoplastic polyurethane film and a second thermoplastic film bonded on each side of the thermoplastic polyurethane film via a water-based adhesive.

BACKGROUND OF THE INVENTION

A functional film and/or a photochromic film is used to add protection or various optical properties to an optical lens. Due to its soft texture, each side of the functional film and/or photochromic film is usually laminated with an optical thermoplastic film using an adhesive. The produced polymeric laminate is subsequently incorporated on a surface of an optical lens. To insure the integrity of the laminate on a curved surface of the optical lens, the adhesion between the thermoplastic films of the laminate has to be sufficient to avoid peeling or delamination of the laminate during further lens applications.

Conventionally, there are several types of adhesives used to make a photochromic or functional film containing laminates. For instance, commercially available adhesives such as ultra violet (UV) curable acrylic based adhesive (e.g., Optoclear® 8100 from Onbitt Co.) and polyurethane based adhesive (ADCOTE® L76-205 from Dow Chem Co.) have been used to bond the photochromic film or functional film to the thermoplastic films in the laminates. However, many of these commercially available adhesives are organic solvent-based adhesives that have high environmental impact. A solvent-less two-part polyurethane adhesive can be used to produce the laminate, but the two components of the adhesive have to be mixed and immediately used due to a very short pot life for this type of adhesive. Additionally, addition of catalysts are generally required to shorten the curing duration of the two-part adhesives. Thus, overall it is relatively complex to handle the solvent-less two-part polyurethane adhesive during preparation of the polymeric laminate. UV curable adhesives are another type of most commonly used adhesives. However, UV curable adhesives often have negative impact on the color performance of the laminate due to prolonged exposure to UV light during the curing process. Other newly designed adhesives, such as a glyoxal adhesive system in U.S. Pat. No. 9,315,693, tri-layered adhesive system disclosed in U.S. Pat. No. 8,746,879 or polyvinyl alcohol-based resin adhesive disclosed in PCT publication No. WO 2017009680, have been used for making the polymeric laminates. However, these new adhesives do not have strong adhesion to either the photochromic or functional film, or the polycarbonate or cellulose triacetate based thermoplastic films, resulting in unstable laminates.

Overall, while adhesives and methods exist for preparing a photochromic or functional film-containing laminate, the need for improvements in this field persists in light of at least the aforementioned drawbacks with the conventional adhesives and methods.

SUMMARY OF THE INVENTION

A solution to the above-mentioned problems associated with methods of preparing a photochromic film or functional film-containing laminate has been discovered. The solution resides in a method of preparing the laminate that includes pre-treating the photochromic film or functional film and applying a water-based adhesive between the photochromic or functional film and the second thermoplastic film. By way of example, the front and back surfaces of the photochromic or functional film can be pre-treated by corona treatment before the water-based adhesive is applied. The corona treatment can enable the water-based adhesive to form strong adhesion with both the photochromic or functional film and the second thermoplastic film. Thus, this method is capable of producing strong photochromic or functional film-containing laminates for optical lenses. Furthermore, the use of water-based adhesives can lower the environmental impact compared to using organic-solvent based adhesives in the laminates. Moreover, water-based adhesive does not require complex handling procedures during the preparation of the laminates compared to the two-part adhesives. Therefore, the methods of the present invention provide a technical achievement over at least some of the problems associated with the currently available adhesives and methods of preparing photochromic or functional film containing laminates.

Some embodiments of the present invention are directed to a method of preparing a laminate. The method may comprise providing a first thermoplastic film comprising polyurethane and/or polyether block amide. The first plastic film may include a front surface and a back surface. The method may comprise treating the front surface and/or the back surface of the first thermoplastic film. The method may comprise laminating a second thermoplastic film on the threated front surface and/or the treated back surface of the first thermoplastic film using a water-based adhesive to produce the laminate.

In some aspects, the treating can comprise applying to the first thermoplastic film a treatment that includes isopropyl alcohol (IPA) treatment, corona treatment, plasma treatment, flame treatment, solid $CO_2$ spray treatment, laser cleaning or ablation treatment, soft media treatment, or combinations thereof. In some aspects, the laminate has an adhesion between the first thermoplastic film and the second thermoplastic film in a range of 5 to 80 N/inch and all ranges and values there between including 5 to 10 N/inch, 10 to 15 N/inch, 15 to 20 N/inch, 20 to 25 N/inch, 25 to 30 N/inch, 30 to 35 N/inch, 35 to 40 N/inch, 40 to 45 N/inch, and 45 to 50 N/inch, 50 to 55 N/inch, 55 to 60 N/inch, 60 to 65 N/inch, 65 to 70 N/inch, 70 to 75 N/inch, and 75 to 80 N/inch. In some aspects, the corona treatment may have a treatment duration longer than about 10 seconds. In some aspects, the plasma treatment may have a treatment duration longer than about 20 seconds. In some aspects, the treatment duration for corona treatment may be in a range of 10 to 200 seconds and all ranges and values there between including ranges of 10 to 20 seconds, 20 to 30 seconds, 30 to 40 seconds, 40 to 50 seconds, 50 to 60 seconds, 60 to 70 seconds, 70 to 80 seconds, 80 to 90 seconds, 90 to 100 seconds, 100 to 110 seconds, 110 to 120 seconds, 120 to 130 seconds, 130 to 140 seconds, 140 to 150 seconds, 150 to 160 seconds, 160 to 170 seconds, 170 to 180 seconds, 180 to 190 seconds, and 190 to 200 seconds. In some aspects, the treatment duration for plasma treatment may be in a range of 20 to 300 seconds and all ranges and values there between including ranges of 20 to 30 seconds, 30 to 40 seconds, 40 to 60 seconds, 60 to 80 seconds, 80 to 100 seconds, 100 to 120 seconds, 120 to 140 seconds, 140 to 160 seconds, 160 to 180 seconds, 180 to 200 seconds, 200 to 220 seconds, 220 to 240 seconds, 240 to 260 seconds, 260 to 280 seconds, and 280 to 300 seconds.

In some embodiments, the first thermoplastic film may comprise a functional film and/or a photochromic film containing a photochromic dye, a dichroic dye, a blue cut dye, an infra-red cut dye, a UV cut dye, a selective wavelength cut dye, a color enhancement dye, a light filter dye, or combinations thereof. In embodiments of the invention, the second thermoplastic film may comprise polycarbonate (PC), cellulose triacetate (TAC), polymethyl methacrylate, polyamide, polyethylene terephthalate, cyclic olefin copolymer, or combinations thereof. In some embodiments, the laminating can be carried out using a roll-to-roll process. The roll-to-roll process can include a heating temperature of 60 to 120° C. and all ranges and values there between including ranges of 60 to 70° C., 70 to 80° C., 80 to 90° C., 90 to 100° C., 100 to 110° C., and 110 to 120° C. The roll-to-roll process can include a heating duration of 5 to 30 minutes and all ranges and values there between including ranges of 5 to 10 minutes, 10 to 15 minutes, 15 to 20 minutes, 20 to 25 minutes, and 25 to 30 minutes. The heating in the roll-to-roll process may be adapted to cure the water-based adhesive. In some embodiments, the obtained laminate may be further post-cured or annealed at a temperature in a range of 80 to 130° C. for about 1 hour to 24 hours after the roll-to-roll process.

In some embodiments, non-limiting examples of the water-based adhesive may include a water-based polyvinyl alcohol (PVOH) adhesive, a water-based hot melt adhesive (HMA), a water-based polyurethane latex adhesive, and combinations thereof. In some embodiments, the water-based adhesive may further include a crosslinking agent. Non-limiting examples of the crosslinking agent may include HCl, glyoxal, aldehyde, hemiacetal compounds, acetoacetal group-containing resin or polymers, (e.g., Safe-link® SPM-01, The Nippon Synthetic Chemical Industry Co., Japan), amine, metal salts, hydrazide, or combinations thereof. In some embodiments, the treating of the front surface and/or the back surface of the first thermoplastic film may enable the formation of hydrogen bonds at an interface between the first thermoplastic film and the second thermoplastic film.

Some embodiments of the present invention are directed to a photochromic laminate. The photochromic laminate may comprise a first thermoplastic film comprising a pre-treated front surface and a pre-treated back surface. The photochromic laminate may further comprise a water-based adhesive layer laminated on each of the pre-treated front surface and the pre-treated back surface of the first thermoplastic film. The photochromic laminate may comprise a second thermoplastic film laminated on each of the water-based adhesive layers. In some embodiments, each of the water-based adhesive layers may have a thickness of 0.5 to 10 μm and all ranges and values there between including ranges of 0.5 to 1.0 μm, 1.0 to 1.5 μm, 1.5 to 2.0 μm, 2.0 to 2.5 μm, 2.5 to 3.0 μm, 3.0 to 3.5 μm, 3.5 to 4.0 μm, 4.0 to 4.5 μm, 4.5 to 5.0 μm, 5.0 to 5.5 μm, 5.5 to 6.0 μm, 6.0 to 6.5 μm, 6.5 to 7.0 μm, 7.0 to 7.5 μm, 7.5 to 8.0 μm, 8.0 to 8.5 μm, 8.5 to 9.0 μm, 9.0 to 9.5 μm, and 9.5 to 10.0 μm. In some aspects, the second thermoplastic may comprise polycarbonate, cellulose triacetate, polymethyl methacrylate, polyamide, polyethylene terephthalate, or combinations thereof. The water-based adhesive layer may comprise a water-based polyvinyl alcohol (PVOH) adhesive, a water-based hot melt adhesive (HMA), a water-based polyurethane (PU) latex adhesive, or combinations thereof. In some aspects, the water-based adhesive layer may contain 50 to 97 wt. % water and 3 to 50 wt. % solid content.

Some embodiments of the present invention are directed to a method of preparing a laminate. The method may comprise applying corona and/or plasma treatment to a front surface and/or a back surface of a first thermoplastic film to produce a treated front surface and/or a treated back surface. The method may comprise laminating a second thermoplastic film on the treated front surface and/or the treated back surface of the first thermoplastic film using a water-based adhesive to form hydrogen bonds at an interface between the first thermoplastic film and the second thermoplastic film.

Some embodiments of the present invention are directed to a method of improving bond strength of a water-based adhesive between a first thermoplastic film comprising a polyurethane and/or polyether block amide and a second thermoplastic film. The method may comprise treating a front surface and/or a back surface of the first thermoplastic film to produce a treated front surface and/or a treated back surface. The method may comprise laminating a second thermoplastic film on the treated front surface and/or the treated back surface of the first thermoplastic film using the water-based adhesive. A combination of the treated front surface and/or the treated back surface and the water-based adhesive is capable of forming hydrogen bonds at an interface of the first thermoplastic film and the second thermoplastic film.

The terms "about" or "approximately" are defined as being close to as understood by one of ordinary skill in the art. In one non-limiting embodiment the terms are defined to be within 10%, preferably, within 5%, more preferably, within 1%, and most preferably, within 0.5%.

The terms "wt. %," "vol. %," or "mol. %" refers to a weight, volume, or molar percentage of a component, respectively, based on the total weight, the total volume, or the total moles of material that includes the component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification, includes any measurable decrease or complete inhibition to achieve a desired result.

The term "effective," as that term is used in the specification and/or claims, means adequate to accomplish a desired, expected, or intended result.

The use of the words "a" or "an" when used in conjunction with the term "comprising," "including," "containing," or "having" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The process of the present invention can "comprise," "consist essentially of," or "consist of" particular ingredients, components, compositions, etc., disclosed throughout the specification Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

DESCRIPTION OF THE DRAWINGS

For a more complete understanding, reference is now made to the following descriptions taken in conjunction with the accompanying drawings, in which.

DETAILED DESCRIPTION OF THE INVENTION

The currently available methods and/or adhesives used for making a laminate that comprises a thermoplastic film laminated on each side of a photochromic or functional film suffer the deficiencies including weak bonding strength between the adhesive and the thermoplastic films, high environmental impacts due to organic solvent used in the adhesives, and complex handling procedures for multi-part adhesives. The present invention provides a solution to these problems. The solution is premised on a method of preparing a photochromic film or functional film-containing laminate that comprises pre-treating the front and/or back surface of the photochromic film or functional film and using a water-based adhesive to bond a second thermoplastic film to the treated surface of the photochromic film or functional film. The pre-treatment is capable of enabling the water-based adhesive to form strong bond with both the photochromic film or functional film and the second thermoplastic films. Therefore, the adhesive overcomes the weak bond strength in the laminates occurring in the laminates prepared by conventional methods. Additionally, the water-based adhesive used in the method of the present invention is easy to handle compared to two-part solvent-less adhesives. The water-based adhesive can reduce environmental impact of the organic solvent based adhesives used in the conventional methods.

These and other non-limiting aspects of the present invention are discussed in further detail in the following sections.
A. Method for Preparing a Laminate for an Optical Lens Functional films and/or photochromic films can be incorporated to add extra optical properties to an optical lens. Due to the soft texture of the photochromic films or the functional films, a thermoplastic film, such as a polycarbonate film or cellulose triacetate film, is often laminated to both the front surface and the back surface of the photochromic film or functional film to form a laminate. The laminate can be subsequently incorporated on the surface of an optical lens.

Conventionally, the laminate comprising a functional film is prepared by using a commercially available adhesives including organic solvent based adhesive, UV curable adhesive, two-part polyurethane adhesive etc. These commercial available adhesives suffer various drawbacks including high environmental impact, negative impact on the color performance of the laminate, complex handling procedure, and/or low bonding strength between the adhesive(s) and the second thermoplastic films (e.g., polycarbonate and cellulose triacetate).

Figure 1:
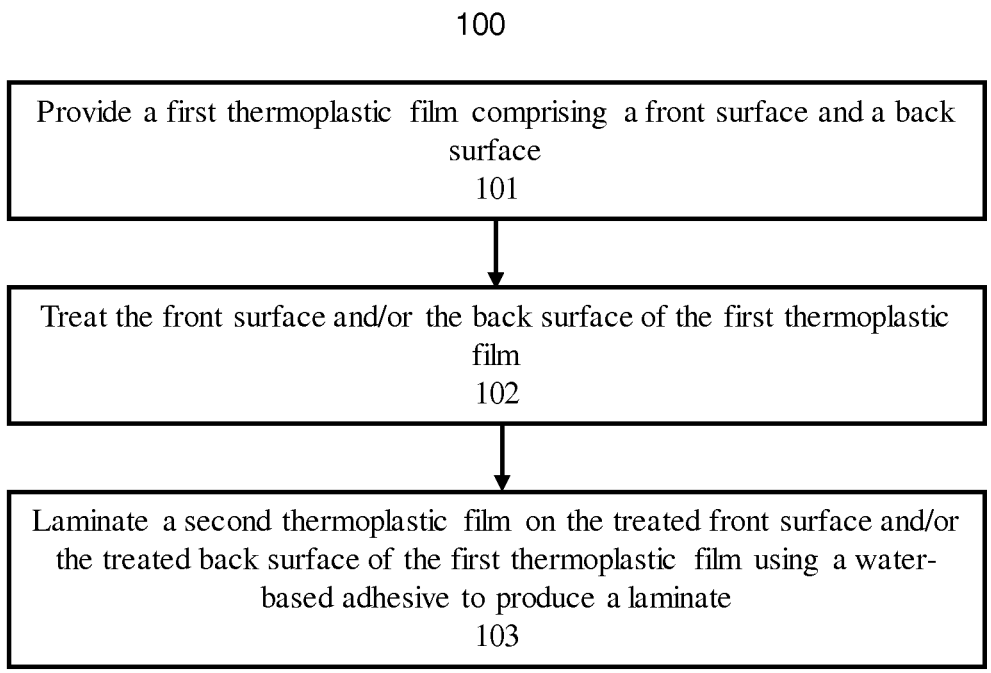
FIG. 1 shows a schematic flowchart for a method of preparing a laminate, according to embodiments of the invention.

The method of the present invention can produce a laminate that uses a water-based adhesive and has a strong adhesion between the adhesive and the thermoplastic layers. As shown in FIG. 1, embodiments of the present invention include method 100 of preparing a laminate that is incorporable to a surface of an optical lens. In embodiments of the invention, the optical lens may include polycarbonate, poly methyl methacrylate, polystyrene, polystyrene maleic anhydride, polyamide, thermoplastic urethane, thermoset polyurethane, polyester, copolyesters, polysulfone, cyclic olefin copolymers, polyphenyl oxide, allyl diglycol carbonate, polythiourethane, episulfur polymers, epoxy, poly(meth) acrylates, polythiomethacrylates, or combinations thereof.

In embodiments of the invention, as shown in block 101, method 100 may comprise providing a first thermoplastic film comprising a front surface and a back surface. In some aspects, the first thermoplastic film may include a thermoplastic polyurethane film. The first thermoplastic polyurethane film may include polyurethane and/or polyether block amide. In some aspects, the first thermoplastic film can comprise a functional film and/or a photochromic film. The functional film and/or photochromic film may contain a photochromic dye, a dichroic dye, a blue cut dye, an infra-red cut dye, a UV cut dye, a selective wavelength cut dye, a color enhancement dye, a light filter dye, or combinations thereof. In some aspects, the functional film or photochromic film may have a thickness in a range of 20 to 500 µm and all ranges and values there between including ranges of 20 to 50 µm, 50 to 100 µm, 100 to 150 µm, 150 to 200 µm, 200 to 250 µm, 250 to 300 µm, 300 to 350 µm, 350 to 400 µm, 400 to 450 µm, and 450 to 500 µm.

In some embodiments of the invention, as shown in block 102, method 100 may further comprise treating the front surface and/or the back surface of the first thermoplastic film. In some aspects, the treating at block 102 may comprise applying a treatment to the front surface and/or the back surface first thermoplastic film. The treatment may include isopropyl alcohol (IPA) treatment, corona treatment, plasma treatment, flame treatment, solid $CO_2$ spray treatment, laser cleaning or ablation treatment, soft media treatment, or combinations thereof.

In some embodiments, the treatment may include corona treatment. The corona treatment may have a duration of more than 10 seconds. In some instances, the duration of the corona treatment may be in a range of 10 to 200 seconds and all ranges and values there between including ranges of 10 to 20 seconds, 20 to 30 seconds, 30 to 40 seconds, 40 to 50 seconds, 50 to 60 seconds, 60 to 70 seconds, 70 to 80 seconds, 80 to 90 seconds, 90 to 100 seconds, 100 to 110 seconds, 110 to 120 seconds, 120 to 130 seconds, 130 to 140 seconds, 40 to 150 seconds, 150 to 160 seconds, 160 to 170 seconds, 170 to 180 seconds, 180 to 190 seconds, and 190 to 200 seconds. In some instances, a distance between treated front surface or treated back surface and a corona head may be in a range of 10 mm to 100 mm and all ranges and values there between including ranges of 10 to 20 mm, 20 to 30 mm, 30 to 40 mm, 40 to 50 mm, 50 to 60 mm, 60 to 70 mm, 70 to 80 mm, 80 to 90 mm, and 90 to 100 mm. In some embodiments, the treatment may include plasma treatment and the plasma treatment may have duration of more than 20 seconds. In some instances, the duration of the plasma treatment may be in a range of 20 to 300 seconds and all ranges and values there between including ranges of 20 to 30 seconds, 30 to 40 seconds, 40 to 60 seconds, 60 to 80 seconds, 80 to 100 seconds, 100 to 120 seconds, 120 to 140 seconds, 140 to 160 seconds, 160 to 180 seconds, 180 to 200 seconds, 200 to 220 seconds, 220 to 240 seconds, 240 to 260 seconds, 260 to 280 seconds, and 280 to 300 seconds. In some instances, the plasma treatment may include vacuum plasma treatment and/or atmospheric plasma treatment.

In some instances, the treating at block 102 may include applying the isopropyl alcohol (IPA) treatment the front surface and/or back surface of the first thermoplastic film, and applying corona treatment and/or plasma treatment to the IPA treated front surface and/or back surface. In some instances, the treating at block 102 may include only IPA treatment. The applying of the isopropyl alcohol treatment may include wiping or dipping the front surface and/or back surface of the first plastic film with isopropyl alcohol. In some embodiments of the invention, method 100 may further include laminating a second thermoplastic film on the threated front surface and/or the treated back surface of the first thermoplastic film using a water-based adhesive to produce the laminate, as shown in block 103. In some aspects, laminating at block 103 may be carried out using a roll-to-roll process. The roll-to-roll process may include heating during the laminating process. The heating may be adapted to cure the water-based adhesive. In some instances, the heating may be carried out at a heating temperature of 60 to 120° C. and all ranges and values there between including ranges of 60 to 70° C., 70 to 80° C., 80 to 90° C., 90 to 100° C., 100 to 110° C., and 110 to 120° C. In some instances, the heating may have a heating duration of 5 to 30 minutes and all ranges and values there between including ranges of 5 to 10 minutes, 10 to 15 minutes, 15 to 20 minutes, 20 to 25 minutes, and 25 to 30 minutes.

In some aspects, the roll-to-roll process may have a roller distance of 0.1 to 3 mm and all ranges and values there between including ranges of 0.1 to 0.3 mm, 0.3 to 0.6 mm, 0.6 to 0.9 mm, 0.9 to 1.2 mm, 1.2 to 1.5 mm, 1.5 to 1.8 mm, 1.8 to 2.1 mm, 2.1 to 2.4 mm, 2.4 to 2.7 mm, and 2.7 to 3.0 mm. In some instances, the roll-to-roll process may be carried out at a laminating pressure of 5 to 50 psi and all ranges and values there between including ranges of 5 to 8 psi, 8 to 11 psi, 11 to 14 psi, 14 to 17 psi, 17 to 20 psi, 20 to 23 psi, 23 to 26 psi, 26 to 29 psi, 29 to 32 psi, 32 to 35 psi, 35 to 38 psi, 38 to 41 psi, 41 to 44 psi, 44 to 47 psi, and 47 to 50 psi. In some instances, the laminate obtained from the roll-to-roll process may be further cured or annealed at a temperature in a ranges of 80 to 130° C. for up to 24 hours.

In some embodiments, the second thermoplastic film may comprise polycarbonate, cellulose triacetate, polymethyl methacrylate, polyamide, polyethylene terephthalate, cyclic olefin copolymer, or combinations thereof. In some aspects, the second thermoplastic film may be optically clear. The second thermoplastic film may have a haze value of 0.1% to 3% and all ranges and values there between including ranges of 0.1 to 0.3%, 0.3 to 0.6%, 0.6 to 0.9%, 0.9 to 1.2%, 1.2 to 1.5%, 1.5 to 1.8%, 1.8 to 2.1%, 2.1 to 2.4%, 2.4 to 2.7%, and 2.7 to 3.0%. In some instances, the second thermoplastic films on the front surface and the back surface of the first thermoplastic films may be different thermoplastic films or substantially the same thermoplastic films. In some embodiments, the water-based adhesive may comprise a water-based polyvinyl alcohol (PVOH) adhesive, a water-based hot melt adhesive (HMA), a water based polyurethane (PU) latex adhesive, or combinations thereof. In some aspects, the water-based adhesive may further include a crosslinking agent. Non-limiting examples of the crosslinking agent may include HCl, glyoxal, aldehyde, hemiacetal compounds, acetoacetal group-containing resin or polymers (e.g., Safe-link® SPM-01, The Nippon Synthetic Industry Co, Japan), amine, metal salts, hydrazide, or combinations thereof. In some instances, the water-based adhesive contains 50 to 97 wt. % water and all ranges and values there between including ranges of 50 to 52 wt. %, 52 to 54 wt. %, 54 to 56 wt. %, 56 to 58 wt. %, 58 to 60 wt. %, 60 to 62 wt. %, 62 to 64 wt. %, 64 to 66 wt. %, 66 to 68 wt. %, 68 to 70 wt. %, 70 to 72 wt. %, 72 to 74 wt. %, 74 to 76 wt. %, 76 to 78 wt. %, 78 to 80 wt. %, 80 to 82 wt. %, 82 to 84 wt. %, 84 to 86 wt. %, 86 to 88 wt. %, 88 to 90 wt. %, 90 to 92 wt. %, 92 to 94 wt. %, 94 to 96 wt. %, and 96 to 97 wt. %. The water-based adhesive further contain 3 to 50 wt. % solid content and all ranges and values there between including 3 to 6 wt. %, 6 to 8 wt. %, 8 to 10 wt. %, 10 to 12 wt. %, 12 to 14 wt. %, 14 to 16 wt. %, 16 to 18 wt. %, 18 to 20 wt. %, 20 to 22 wt. %, 22 to 24 wt. %, 24 to 26 wt. %, 26 to 28 wt. %, 28 to 30 wt. %, 30 to 32 wt. %, 32 to 34 wt. %, 34 to 36 wt. %, 36 to 38 wt. %, 38 to 40 wt. %, 40 to 42 wt. %, 42 to 44 wt. %, 44 to 46 wt. %, 46 to 48 wt. %, and 48 to 50 wt. %. In some embodiments, the laminate has an adhesion (peel force) between the first thermoplastic film and the second thermoplastic film greater than 5 N/inch. In some instances, the adhesion between the first thermoplastic film and the second thermoplastic film in the laminate may be in a range of 5 to 80 N/inch and all ranges and values there between including 5 to 10 N/inch, 10 to 15 N/inch, 15 to 20 N/inch, 20 to 25 N/inch, 25 to 30 N/inch, 30 to 35 N/inch, 35 to 40 N/inch, 40 to 45 N/inch, 45 to 50 N/inch, 50 to 55 N/inch, 55 to 60 N/inch, 60 to 65 N/inch, and 65 to 70 N/inch, 70 to 75 N/inch, and 75 to 80 N/inch.

Figure 2:
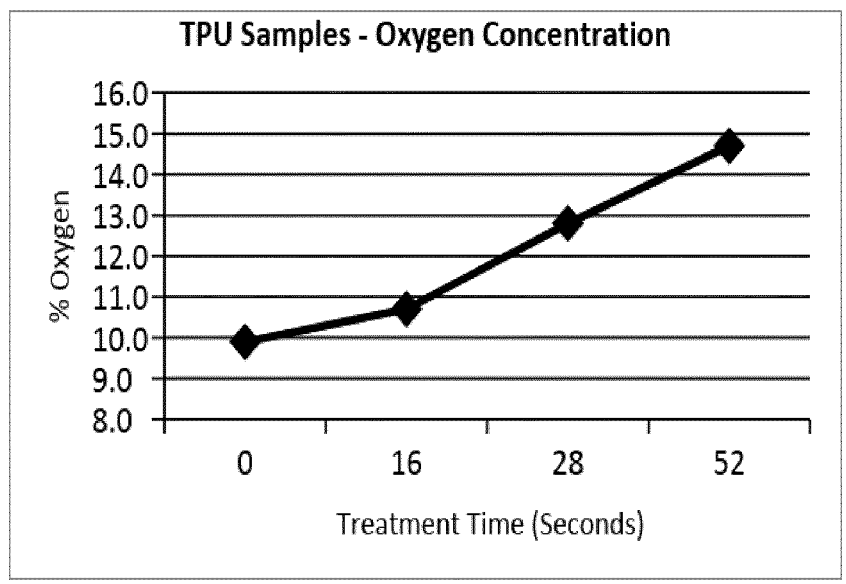
FIG. 2 shows a plot depicting the correlation between treatment time of corona treatment and the oxygen concentration on the treated surface of the first thermoplastic film.

In embodiments of the invention, during the laminating at block 103, the treating of the front surface and/or the back surface of the first thermoplastic film at block 102 may enable the formation of the hydrogen bonds at an interface between the first thermoplastic film and the second thermoplastic film, resulting in improved adhesion between the first plastic film and the second plastic film compared to laminates produced using conventional methods. In some instances, the formation of the hydrogen bonds may be facilitated by heating during the laminating at block 103. In some aspects, as shown in FIG. 2, when the first thermoplastic film is treated by corona, oxygen concentration on the treated surface of the first thermoplastic film may increase, thereby facilitating the formation of hydrogen bonds with the water-based adhesive and/or the second thermoplastic film during laminating of block 103. In some instances, an oxygen concentration of the treated front surface and/or treated back surface may be higher than 11 wt. % such that the adhesion between the first thermoplastic film and the second thermoplastic film is greater than 5 N/inch. In some aspects, during the laminating at block 103, the treated front surface and/or back surface of the first thermoplastic film and the water-based adhesive may produce a chemical compound that improves adhesion between the first plastic film and the second plastic film compared to laminates produced using conventional methods.

B. Photochromic Laminate Produced Using Water-Based Adhesive

Embodiments of the invention include a photochromic laminate for an optical lens. In some embodiments, the photochromic laminate may be prepared by method 100 as described above. In embodiments of the invention, the photochromic laminate may include a first thermoplastic film comprising a pre-treated front surface and a pre-treated back surface. In certain aspects, the first thermoplastic polyurethane film may include polyurethane and/or polyether block amide. The first thermoplastic film may include a photochromic film containing a photochromic dye, a dichroic dye, a blue cut dye, an infra-red cut dye, a UV cut dye, a selective wavelength cut dye, a color enhancement dye, a light filter dye, or combinations thereof. In some embodiments, the front surface and the back surface of the first thermoplastic film may be pre-treated according to the treating step at block 102 as shown in FIG. 1. The pre-treating may include isopropyl alcohol (IPA) treatment, corona treatment, plasma treatment, flame treatment, solid $CO_2$ spray treatment, laser cleaning or ablation treatment, soft media treatment, or combinations thereof.

In some embodiments, the photochromic laminate may further include a water-based adhesive layer laminated on each of the pre-treated front surface and the pre-treated back surface of the first thermoplastic film. In certain aspects, the water based adhesive layer may comprise a water-based adhesive used in method 100 including a water-based polyvinyl alcohol (PVOH) adhesive, a water-based hot melt adhesive (HMA), a water based polyurethane (PU) latex adhesive, or combinations thereof. The water-based adhesive layer may further include crosslinking agent that include HCl, glyoxal, aldehyde, hemiacetal compounds, acetoacetal group-containing resin or polymers (e.g., Safe-link® SPM-01, The Nippon Synthetic Chemical Industry Co., Japan), amine, metal salts, hydrazide, or combinations thereof. In some instances, the water-based adhesive contains 50 to 97 wt. % water and all ranges and values there between including ranges of 50 to 52 wt. %, 52 to 54 wt. %, 54 to 56 wt. %, 56 to 58 wt. %, 58 to 60 wt. %, 60 to 62 wt. %, 62 to 64 wt. %, 64 to 66 wt. %, 66 to 68 wt. %, 68 to 70 wt. %, 70 to 72 wt. %. 72 to 74 wt. %, 74 to 76 wt. %, 76 to 78 wt. %. 78 to 80 wt. %, 80 to 82 wt. %, 82 to 84 wt. %, 84 to 86 wt. %. 86 to 88 wt. %, 88 to 90 wt. %, 90 to 92 wt. %. 92 to 94 wt. %, 94 to 96 wt. %, and 96 to 97 wt. %. The water-based adhesive may contain 3 to 50 wt. % solid content and all ranges and values there between including 3 to 6 wt. %, 6 to 8 wt. %, 8 to 10 wt. %, 10 to 12 wt. %, 12 to 14 wt. %, 14 to 16 wt. %, 16 to 18 wt. %, 18 to 20 wt. %, 20 to 22 wt. %, 22 to 24 wt. %, 24 to 26 wt. %, 26 to 28 wt. %, and 28 to 30 wt. %, 30 to 32 wt. %, 32 to 34 wt. %, 34 to 36 wt. %, 36 to 38 wt. %, 38 to 40 wt. %, 40 to 42 wt. %, 42 to 44 wt. %, 44 to 46 wt. %, 46 to 48 wt. %, and 48 to 50 wt. %. In some aspects, the water in the water-based adhesive may be evaporated during the laminating step at block 103 in method 100. In some aspects, the water-based adhesive may have a thickness of 0.5 to 10 μm and all ranges and values there between including 0.5 to 1.0 μm, 1.0 to 1.5 μm, 1.5 to 2.0 μm, 2.0 to 2.5 μm, 2.5 to 3.0 μm, 3.0 to 3.5 μm, 3.5 to 4.0 μm, 4.0 to 4.5 μm, 4.5 to 5.0 μm, 5.0 to 5.5 μm, 5.5 to 6.0 μm, 6.0 to 6.5 μm, 6.5 to 7.0 μm, 7.0 to 7.5 μm, 7.5 to 8.0 μm, 8.0 to 8.5 μm, 8.5 to 9.0 μm, 9.0 to 9.5 μm, and 9.5 to 10.0 μm.

In some embodiments, the photochromic laminate may further include a second thermoplastic film laminated on each of the water-based adhesive layers. In some aspects, the second thermoplastic film may include polycarbonate, cellulose triacetate, polymethyl methacrylate, polyamide, polyethylene terephthalate cyclic olefin copolymer, or combinations thereof. In some instances, the second thermoplastic film may be laminated according to the laminating step at block 103 of method 100. In some aspects, the second thermoplastic films laminated on the front surface and the back surface of the first thermoplastic film may each individually comprise polycarbonate, cellulose triacetate, polymethyl methacrylate, polyamide, polyethylene terephthalate, cyclic olefin copolymer, or combinations thereof. Therefore, the second thermoplastic films laminated on the front surface and the back surface of the first thermoplastic film may be different thermoplastic films or the substantially the same thermoplastic films.

As part of the disclosure of the present invention, specific examples are included below. The examples are for illustrative purposes only and are not intended to limit the invention. Those of ordinary skill in the art will readily recognize parameters that can be changed or modified to yield essentially the same results.

Example 1

Preparation of PC-TPU-PC Laminate by a Water-Based HMA

A photochromic film was produced using a commercial thermoplastic polyurethane (TPU) resin (Tecoflex® 80A from Lubrizol®) with a photochromic dye. The photochromic film was then cleaned by IPA and treated by corona treatment using a 3DT™ corona apparatus (Model: Multi-Dyne 2, the United States) for about 53 seconds on each side. After the corona treatment, a polycarbonate (PC) film was laminated on each side of the photochromic film using a water-based hot-melt adhesive (HMA) (UD-104 from Bond Polymers International Co, 50% water diluted) in a roll lamination process at 15 psi roll pressure and a heating temperature of 100° C. for 10 min. After heating, a strong adhesion between PC and TPU film was obtained. The peel force of the laminate was measured by Mark-10™ peel force equipment.

Example 2

Preparation of PC-TPU-PC Laminate by a Water-Based PVOH

A PC-TPU-PC laminate was prepared using the same procedure as described in Example 1 except that the water-based adhesive in Example 2 was a water-based polyvinyl alcohol (PVOH). The water-based adhesive included 5 wt. % PVOH (Z-320, Nippon Gohsei) and about 0.1 wt. % of HCl. The peel force of the laminate was measured by Mark-10™ peel force equipment.

Example 3

Preparation of TAC-TPU-TAC Laminate by a Water-Based PVOH

The laminate was prepared using the same procedure as Example 2 except that a commercial cellulose triacetate (TAC) film instead of a polycarbonate film was laminated on each side of the TPU film using the same water-based PVOH adhesive of Example 2 to form a TAC-TPU-TAC laminate. The peel force of the laminate was measured by Mark-10™ peel force equipment.

Example 4

Preparation of TAC-TPU-TAC Laminate by a Water-Based Latex

The laminate was prepared using the same procedure as Example 3 except that the adhesive used in Example 4 was a water-based latex adhesive (A-415 of Essilor made by a water based polyurethane dispersion latex W234 from Witcobond Inc.). The peel force of the laminate was measured by Mark-10™ peel force equipment.

Example 5

Preparation of TAC-PEBA-TAC Laminate by a Water-Based HMA

A polyether block amide (PEBA) photochromic film was cleaned using a detergent soap and was then corona treated using 3DT™ corona (MultiDyne 2) for about 53 seconds on each side thereof. A polycarbonate film was laminated on each side of the photochromic film using a water-based hot-melt adhesive (HMA) (UD-104 from Bond Polymers International Co, 50% water diluted) in a roll lamination process with a 15 psi roll pressure and a heating temperature of 100° C. for 10 minutes. The peel force of the laminate was measured by Mark-10 peel force equipment.

Example 6

Comparative Example: Preparation of PC-PVA-PC Laminate by a Water-Based HMA

A laminate was prepared using the same procedure as Example 1 except the TPU photochromic film was replaced by a polarizing poly vinyl alcohol (PVA) film. The produced PC-PVA-PC laminate showed low adhesion as the peel force for the laminate was less than 3 N/inch and the PC film could be peeled off easily by hand.

Example 7

Comparative Example: Preparation of PC-TPU-PC Laminate with Corona Treatment and UV Curable Adhesive A laminate was prepared using the same procedure as Example 1 except that the water-based hot-melt adhesive in Example 1 was replace by a UV curable adhesive. The adhesive was cured by exposure to Xenon UV lamp for 20 seconds on each side thereof. The produced PC-TPU-PC laminate showed low adhesion level between films as the peel force for the laminate was less than 3 N/inch and the PC film could be peeled off easily by hand.

Example 8

Comparative Example: Preparation of PC-TPU-PC Laminate without Corona Treatment

A PC-TPU-PC laminate was prepared using the same procedure as Example 1 except that the TPU film in Example 7 was not treated with corona treatment. The produced PC-TPU-PC laminate showed poor adhesion as the peel force for the laminate was less than 3 N/inch and the PC film could be peeled off easily by hand.

Example 9

Comparative Example: Preparation of PC-PC Laminate with Water-Based HMA

A PC-PC laminate was prepared using the same procedure as Example 1 except that the TPU film in Example 1 was replaced by a PC film. The produced PC-PC laminate showed poor adhesion as the peel force for the laminate was less than 3 N/inch and the PC film could be peeled off easily by hand.

Example 10

Comparison of Adhesion Levels for Laminates Prepared in Examples 1-9

The adhesion between the layers of the laminates obtained from Examples 1-9 were compared. The results are shown in Table 1. As shown in Table 1, the laminates produced in Examples 1-5 all had high adhesion level with the peel forces of at least 40 N/inch. For the laminates produced in all comparative examples (Examples 6-9), the adhesion levels between each layers were lower than 3 N/inch. The results indicate that the corona treatment on the thermoplastic polyurethane (TPU) film can significantly improve the adhesion between polycarbonate and the water-based adhesive. The results further indicate that the corona treatment does not improve the adhesion when the adhesive is not a water-based adhesive. Furthermore, corona treatment on the polycarbonate films or the PVA films does not improve the adhesion between the films of the laminates.

TABLE 1

Comparison of adhesion for laminates produced in Examples 1-9

| Example | Laminates | Film surface treatment | Adhesives | Curing conditions | Adhesion |
|---|---|---|---|---|---|
| 1 | PC-TPU-PC | TPU w/ corona | HMA | 100° C. for 10 min | >50 N/inch |
| 2 | PC-TPU-PC | TPU w/ corona | PVOH | 100° C. for 10 min | >50 N/inch |
| 3 | TAC-TPU-TAC | TPU w/ corona | PVOH | 100° C. for 10 min | >50 N/inch |
| 4 | TAC-TPU-TAC | TPU w/ corona | Latex | 100° C. for 10 min | >50 N/inch |

TABLE 1-continued

Comparison of adhesion for laminates produced in Examples 1-9

| Example | Laminates | Film surface treatment | Adhesives | Curing conditions | Adhesion |
|---|---|---|---|---|---|
| 5 | TAC-Pebax-TAC | TPU w/ corona | HMA | 100° C. for 10 min | >40 N/inch |
| 6 | PC-PVA-PC | PVA w/ corona | HMA | 100° C. for 10 min | <3 N/inch |
| 7 | PC-TPU-PC | TPU w/ corona | UV adhesive | UV curing @ 20 s | <3 N/inch |
| 8 | PC-TPU-PC | TPU w/o corona | HMA | 100° C. for 10 min | <3 N/inch |
| 9 | PC-PC | PC w/ corona | HMA | 100° C. for 10 min | <3 N/inch |

Example 11

Preparation of Photochromic PC-TPU-PC Laminate and Lens Using Water-Based Adhesive TPU Photochromic Film Preparation A commercial TPU resin (Tecoflex® 80A from Lubrizol®) was extruded with photochromic dye to produce a photochromic TPU film having a thickness of about 200 μm. The photochromic TPU film was optically clear and transparent with a haze value about 0.9%. The obtained film has good photochromic performance in terms of fading speed and darkness. The $t_{1/2}$ of the fading speed was about 30 seconds (measured by BMP equipment).

PC-TPU-PC Photochromic Laminate Preparation

The obtained photochromic TPU film was pre-treated by corona treatment using a 3-DT™ corona equipment for about 1 minute. The pre-treated photochromic TPU film was then laminated with PC films on each side thereof using 50 wt. % water diluted water-based hot-melt adhesive (UD-104 from Bond Polymers Inc.). The laminate was made in a lab roll lamination process with a roll pressure of 20 psi. Heating was applied in the lamination process at a temperature of 100° C. for 10 min. After lamination, the PC-TPU-PC laminate showed strong adhesion and substantially the same photochromic performance as the TPU photochromic film ($t_{1/2}$ of the fading speed was about 30 seconds).

PC Photochromic Semi-Finished Lens Preparation

The obtained PC-TPU-PC photochromic laminate was then die-cut into a 076 mm disc for injection with PC resin in a standard polar wafer injection process. The obtained PC photochromic semi-finished lens showed good adhesion (peel force greater than 50 N/inch) and maintained excellent photochromic performance with an faster fading speed ($t_{1/2}$ of fading speed is about 24 seconds) than the photochromic film in the laminate. The semi-finished polycarbonate photochromic lens was then surfaced to −3.00 prescription and further hard-coated without any delamination.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, treatment, machine, manufacture, composition of matter, means, methods, and/or steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:

1. A method of preparing a laminate, the method comprising:
    providing a first thermoplastic film that is a functional film and/or a photochromic film comprising polyurethane and/or polyether block amide, wherein the first thermoplastic film includes a front surface and a back surface;
    treating the front surface and the back surface of the first thermoplastic film; and
    laminating a second thermoplastic film on the treated front surface and on the treated back surface of the first thermoplastic film using a water-based adhesive to produce the laminate,
    wherein the second thermoplastic film comprises polycarbonate, cellulose triacetate, polymethyl methacrylate, polyamide, polyethylene terephthalate, cyclic olefin copolymer, or combinations thereof.

2. The method of claim 1, wherein the treating comprises applying to the first thermoplastic film a treatment that includes isopropyl alcohol (IPA) treatment, corona treatment, plasma treatment, flame treatment, solid $CO_2$ spray treatment, laser cleaning or ablation treatment, soft media treatment, or combinations thereof.

3. The method of claim 2, wherein the laminate has an adhesion between the first thermoplastic film and the second thermoplastic film in a range of 5 to 80 N/inch.

4. The method of claim 2, wherein the corona treatment has a treatment duration longer than about 10 seconds and the plasma treatment has a treatment duration longer than about 20 seconds.

5. The method of claim 1, wherein the functional film and/or the photochromic film of the first thermoplastic film contains a photochromic dye, a dichroic dye, a blue cut dye, an infrared cut dye, a UV cut dye, a selective wavelength cut dye, a color enhancement dye, a light filter dye, or combinations thereof.

6. The method of claim 1, wherein the laminating is carried out using a roll-to-roll process wherein the roll-to-roll process includes a heating temperature of 60 to 120° C. and a heating duration of 5 to 30 minutes to cure the water-based adhesive, and optionally further curing or annealing the laminate at a temperature in a range of 80 to 130° C. for up to 24 hours.

7. The method of claim 1, wherein the water-based adhesive comprises a water-based polyvinyl alcohol (PVOH) adhesive, a water-based hot melt adhesive (HMA), a water-based polyurethane (PU) latex adhesive, or combinations thereof.

8. The method of claim 7, wherein the water-based adhesive further comprises a crosslinking agent comprising HCl, glyoxal, aldehyde, hemiacetal compounds, acetoacetal group-containing resin or polymers, amine, metal salts, hydrazide, or combinations thereof.

9. The method of claim 1, wherein the treating of the front surface and/or the back surface of the first thermoplastic film enables the formation of hydrogen bonds at an interface between the first thermoplastic film and the second thermoplastic film.

10. A photochromic laminate comprising:
    a first thermoplastic film that is a functional film and/or a photochromic film comprising a pre-treated front surface and a pre-treated back surface;
    a water-based adhesive layer laminated on each of the pre-treated front surface and the pre-treated back surface of the first thermoplastic film; and
    a second thermoplastic film laminated on each of the water-based adhesive layers,
        wherein the second thermoplastic film comprises polycarbonate, cellulose triacetate, polymethyl methacrylate, polyamide, polyethylene terephthalate, cyclic olefin copolymer, or combinations thereof.

11. The photochromic laminate of claim 10, wherein each of the water-based adhesive layers has a thickness of 0.5 to 10 μm.

12. The photochromic laminate of claim 10, wherein the water-based adhesive layer comprises a water-based polyvinyl alcohol (PVOH) adhesive, a water-based hot melt adhesive (HMA), a water-based polyurethane (PU) latex adhesive, or combinations thereof.

13. The photochromic laminate of claim 10, wherein the water-based adhesive contains 50 to 97 wt. % water and 3 to 50 wt. % solid content.

* * * * *